(12) United States Patent
Koike

(10) Patent No.: US 10,512,111 B2
(45) Date of Patent: Dec. 17, 2019

(54) ELECTRONIC APPARATUS AND CONTROL METHOD THEREOF

(71) Applicant: CANON KABUSHIKI KAISHA, Tokyo (JP)

(72) Inventor: Kohtaro Koike, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/211,336

(22) Filed: Dec. 6, 2018

(65) Prior Publication Data

US 2019/0182877 A1    Jun. 13, 2019

(30) Foreign Application Priority Data

Dec. 12, 2017    (JP) .................... 2017-237853

(51) Int. Cl.
*H04W 76/14* (2018.01)
*H04W 52/02* (2009.01)
*H04W 4/80* (2018.01)

(52) U.S. Cl.
CPC ............. *H04W 76/14* (2018.02); *H04W 4/80* (2018.02); *H04W 52/0229* (2013.01)

(58) Field of Classification Search
CPC .... H04W 76/14; H04W 4/80; H04W 52/0229
See application file for complete search history.

(56) References Cited

U.S. PATENT DOCUMENTS

| | | | | |
|---|---|---|---|---|
| 9,398,631 B2 * | 7/2016 | Hsu | .................... | H04W 76/14 |
| 9,913,081 B1 * | 3/2018 | Thanayankizil | ..... | H04B 1/3822 |
| 10,093,197 B2 * | 10/2018 | Deljevic | ................. | B60L 58/12 |
| 2007/0226351 A1 * | 9/2007 | Fischer | ................. | H04W 76/14 |
| | | | | 709/227 |
| 2010/0161720 A1 * | 6/2010 | Colligan | ................ | G06Q 30/02 |
| | | | | 709/203 |
| 2010/0255782 A1 * | 10/2010 | Klemmensen | ... | H04N 21/43637 |
| | | | | 455/41.2 |
| 2013/0308512 A1 * | 11/2013 | Jeong | ................. | H04W 52/0225 |
| | | | | 370/311 |
| 2016/0044598 A1 * | 2/2016 | Wei | ................... | H04W 52/0251 |
| | | | | 370/311 |

(Continued)

FOREIGN PATENT DOCUMENTS

JP    2007-142839 A    6/2007

*Primary Examiner* — Lewis G West
(74) *Attorney, Agent, or Firm* — Cowan, Liebowitz & Latman, P.C.

(57) ABSTRACT

An electronic apparatus comprises a communication unit that wirelessly communicates with an external apparatus present within a predetermined range, and a control unit that controls the electronic apparatus. Upon receiving a connection request from the external apparatus in response to an advertisement signal transmitted via the communication unit when the control unit is in a sleep state in which its power consumption is reduced, the control unit returns from the sleep state and determines whether or not the external apparatus, which has transmitted the connection request, has been connected to the electronic apparatus in the past, and if determining that the external apparatus, which has transmitted the connection request, has not been connected to the electronic apparatus in the past, the control unit transits to the sleep state.

13 Claims, 10 Drawing Sheets

(56) References Cited

U.S. PATENT DOCUMENTS

| | | | |
|---|---|---|---|
| 2016/0095047 A1* | 3/2016 | Lee | H04W 4/80 370/328 |
| 2016/0119961 A1* | 4/2016 | Hrabak | H04B 1/3822 455/41.2 |
| 2017/0078962 A1* | 3/2017 | Hassan | H04W 76/10 |

* cited by examiner

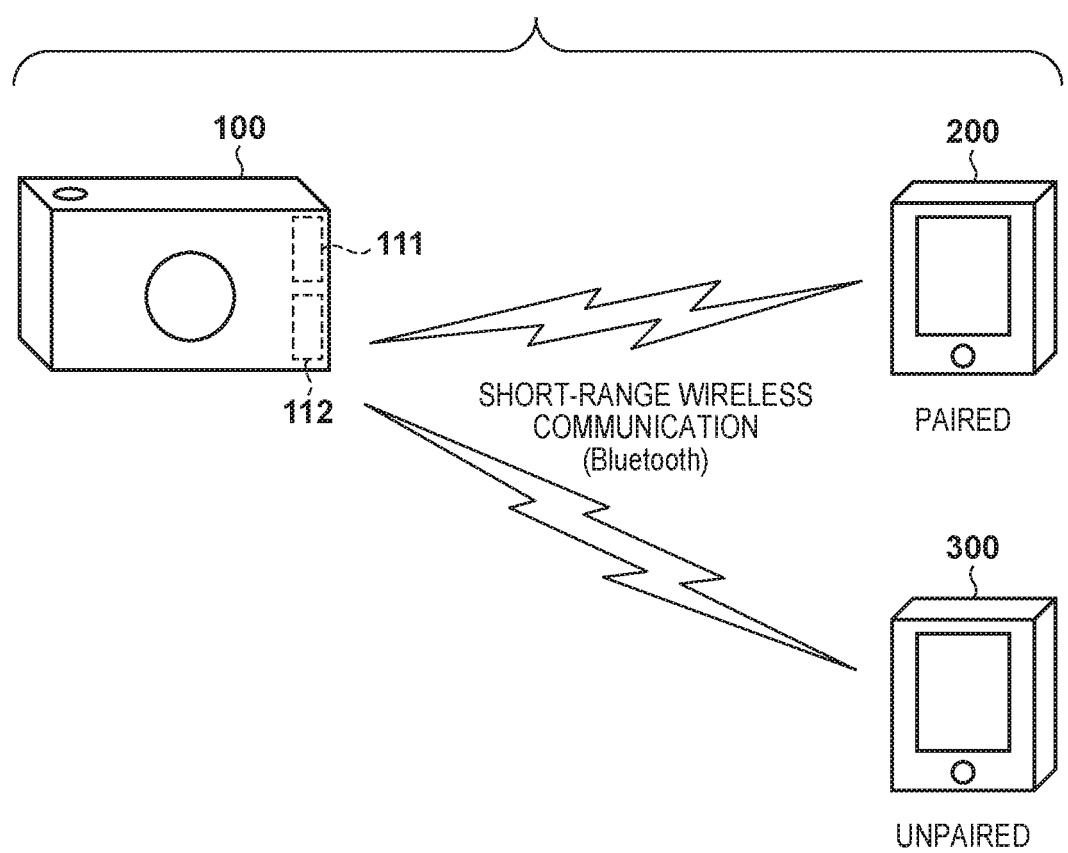

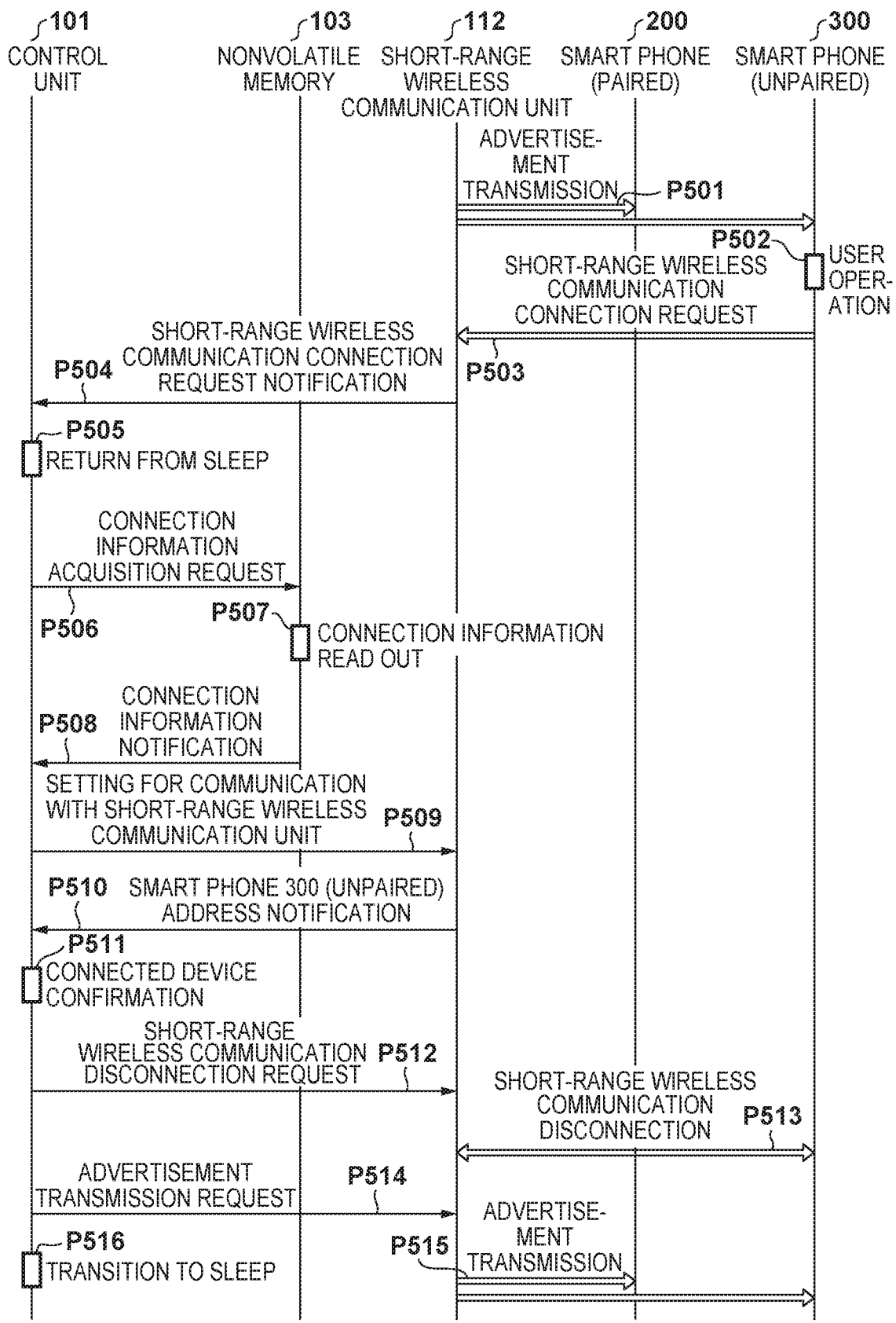

ELECTRONIC APPARATUS AND CONTROL METHOD THEREOF

BACKGROUND OF THE INVENTION

Field of the Invention

The present invention relates to a technology for performing wireless communication.

Description of the Related Art

Conventionally, electronic apparatuses, such as digital cameras, have a communication facility to connect with external apparatuses, such as smart phones, and there are electronic apparatuses that are compatible with a plurality of communication systems, such as wireless LAN and Bluetooth®. The electronic apparatuses are capable of returning from a sleep state to be remotely controlled from external apparatuses via applications by performing a short-range wireless communication, such as Bluetooth®.

In the communication field, such as remote control, a technology is known that lets the user know whether or not the user is communicating with the connection partner. In Japanese Patent Laid-Open No. 2007-142839, even when an electronic apparatus is communicating with an external apparatus, the signal strength icon is not displayed unless an application is activated, so that the user does not notice that the user is in communication with the external apparatus.

Some communication apparatuses are triggered by communication with an external apparatus to return from a sleep/power off state. Generally, as such an apparatus performs some operation upon activation, the user can tell the apparatus is activated.

SUMMARY OF THE INVENTION

The present invention has been made in consideration of the aforementioned problems, and one aspect of the present invention is to provide a configuration that does not let the user know that an apparatus has returned from a sleep state as a result of communication with an external apparatus unless it is necessary.

In order to solve the aforementioned problems, the present invention provides an electronic apparatus comprising: a communication unit configured to wirelessly communicate with an external apparatus present within a predetermined range; and a control unit configured to control the electronic apparatus; wherein, upon receiving a connection request from the external apparatus in response to an advertisement signal transmitted via the communication unit when the control unit is in a sleep state in which its power consumption is reduced, the control unit returns from the sleep state and determines whether or not the external apparatus, which has transmitted the connection request, has been connected to the electronic apparatus in the past, and if determining that the external apparatus, which has transmitted the connection request, has not been connected to the electronic apparatus in the past, the control unit transits to the sleep state.

In order to solve the aforementioned problems, the present invention provides an electronic apparatus comprising: a communication unit configured to wirelessly communicate with an external apparatus present within a predetermined range; and a control unit configured to control the electronic apparatus; wherein, upon receiving a connection request from the external apparatus in response to an advertisement signal transmitted via the communication unit when the control unit is in a sleep state in which its power consumption is reduced, the control unit returns from the sleep state and determines whether or not the control unit has returned from the sleep state in response to predetermined operation on the external apparatus, and if determining that the control unit has returned from the sleep state not via the predetermined operation, the control unit transits to the sleep state.

In order to solve the aforementioned problems, the present invention provides a method of controlling an electronic apparatus having a communication unit configured to wirelessly communicate with an external apparatus present within a predetermined range, and a control unit configured to control the electronic apparatus, the method comprising causing the control unit to: upon receiving a connection request from the external apparatus in response to an advertisement signal transmitted via the communication unit when the control unit is in a sleep state in which its power consumption is reduced, return from the sleep state and determine whether or not the external apparatus, which has transmitted the connection request, has been connected to the electronic apparatus in the past, and transit to the sleep state if it is determined that the external apparatus, which has transmitted the connection request, has not been connected to the electronic apparatus in the past.

In order to solve the aforementioned problems, the present invention provides a method of controlling an electronic apparatus having a communication unit configured to wirelessly communicate with an external apparatus present within a predetermined range, and a control unit configured to control the electronic apparatus, the method comprising causing the control unit to: upon receiving a connection request from the external apparatus in response to an advertisement signal transmitted via the communication unit when the control unit is in a sleep state in which its power consumption is reduced, return from the sleep state and determine whether or not the control unit has returned from the sleep state in response to predetermined operation on the external apparatus, and transit to the sleep state if determining that the control unit has not returned from the sleep state due to the predetermined operation.

In order to solve the aforementioned problems, the present invention provides a non-transitory computer-readable storage medium storing a program for causing a computer to function as an electronic apparatus comprising: a communication unit configured to wirelessly communicate with an external apparatus present within a predetermined range; and a control unit configured to control the electronic apparatus; wherein, upon receiving a connection request from the external apparatus in response to an advertisement signal transmitted via the communication unit when the control unit is in a sleep state in which its power consumption is reduced, the control unit returns from the sleep state and determines whether or not the external apparatus, which has transmitted the connection request, has been connected to the electronic apparatus in the past, and if determining that the external apparatus, which has transmitted the connection request, has not been connected to the electronic apparatus in the past, the control unit transits to the sleep state.

In order to solve the aforementioned problems, the present invention provides a non-transitory computer-readable storage medium storing a program for causing a computer to function as an electronic apparatus comprising: a communication unit configured to wirelessly communicate with an external apparatus present within a predetermined range, and a control unit configured to control the electronic apparatus; wherein, upon receiving a connection request from the external apparatus in response to an advertisement signal transmitted via the communication unit when the control unit is in a sleep state in which its power consumption is reduced, the control unit returns from the sleep state and determines whether or not the control unit has returned from the sleep state in response to predetermined operation on the external apparatus, and if determining that the control unit has returned from the sleep state not via the predetermined operation, the control unit transits to the sleep state.

According to the present invention, it is possible to not let the user know that an apparatus has returned from a sleep state as a result of communication with an external apparatus unless it is necessary.

Further features of the present invention will become apparent from the following description of exemplary embodiments (with reference to the attached drawings).

BRIEF DESCRIPTION OF THE DRAWINGS

FIG. 3 is a view showing the system configuration of the first embodiment.

FIG. 5 is a sequence diagram showing how the digital camera of the first embodiment communicates with an unpaired smart phone.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

In the present embodiment, the following describes a system in which an electronic apparatus, such as a digital camera 100, present within a predetermined range and an external apparatus, such as a smart phone 200, perform short-range wireless communication according to Bluetooth® standard. Note that the electronic apparatus of the present embodiment is not limited to the digital camera 100. For example, the electronic apparatus may be a tablet device, a media player, a surveillance camera, medical equipment, or the like. Also, the external apparatus of the present embodiment is not limited to a smart phone, which is one type of a cellular phone. For example, the external apparatus may be a portable apparatus, such as a wristwatch-type terminal, a spectacle-type terminal, a digital camera with wireless communication capability, a tablet device, a personal computer, or the like.

<Configuration of Digital Camera>

The configuration and functions of a digital camera of the present embodiment will be generally described with reference to FIGS. 1A to 1C.

Figure 1A:
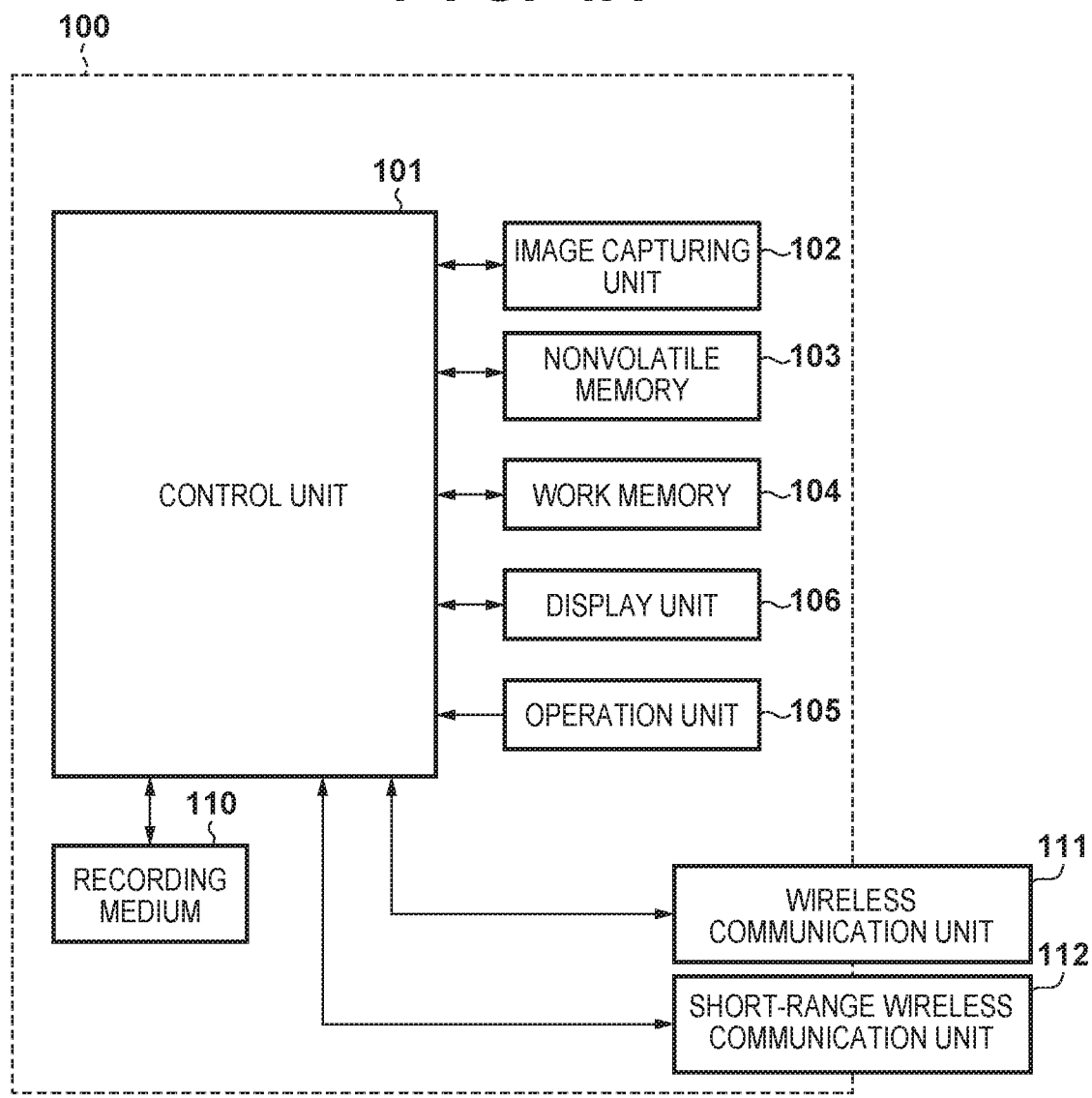
FIG. 1A is a block diagram of a digital camera of the first and second embodiments.

FIG. 1A is a functional block diagram of a digital camera 100. FIGS. 1B and 1C are front view and back view of the digital camera 100.

A control unit 101 is an arithmetic processing unit (CPU) which comprehensively controls the overall digital camera 100, and implements control sequence (to be described later) by executing programs stored in a nonvolatile memory 103 (to be described later). Note that a plurality of pieces of hardware may control the overall apparatus by sharing processes instead of making the control unit 101 control the overall apparatus.

An image capturing unit 102 includes a lens group including a zoom lens and a focus lens and a shutter having a stop function. The image capturing unit 102 also includes an image sensor formed from a CCD, CMOS device, or the like which converts an object image into electrical signal, and an A/D converter which converts the analog image signal output from the image sensor into digital signal.

The image capturing unit 102 has an image processing circuit, and performs image quality adjustment processing of adjusting white balance, color, brightness, and the like with respect to captured image data, and also performs, for example, resize processing to a display size. The image capturing unit 102 also generates an image file by compressing and coding the image data having undergone image quality adjustment processing by JPEG or the like, and records the file in a recording medium 110. In the present embodiment, the image data is recorded in the recording medium 110 so as to conform to DCF (Design Rule for Camera File System) standard. The image capturing unit 102 also performs predetermined arithmetic processing by using captured image data. The control unit 101 then controls the focus lens, stop, and shutter of the image capturing unit 102 based on the obtained arithmetic result, thereby performing AF (Automatic Focus) processing and AE (Automatic Exposure) processing.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing each processing of sequence and flowchart, which will be described later in the present embodiment.

A work memory 104 is used as a work area where constants and variables for the operation of the control unit 101, programs read out from the nonvolatile memory 103, and the like are loaded. The work memory 104 is also used as a buffer memory for temporarily holding the image data captured by the image capturing unit 102 or an image display memory for a display unit 106.

An operation unit 105 is constituted by operation members such as various types of switches and buttons and a touch panel which accept various types of operations from the user. The operation unit 105 includes, for example, a shutter button 105a for performing image shooting, a reproduction button 105b for performing a reproduction of shot images, and four-directional keys 105c having up, down, left and right buttons for performing various settings of the camera, as shown in FIGS. 1B and 1C. The operation unit 105 also includes a touch panel 105d integrally formed on the display unit 106 described later. The operation unit 105 also includes a power supply switch 105e for turning on and off the power of the digital camera 100.

The shutter button 105a is turned on to generate a first shutter switch signal SW1 when the shutter button 105b is operated halfway, that is, half-pressed (shooting preparation instruction). Upon receiving the first shutter switch signal SW1, the control unit 101 controls the image capturing unit 102 to start an operation such as AF (Automatic Focus) processing, AE (Automatic Exposure) processing, AWB (Automatic White Balance) processing, or EF (Electronic Flash) processing. In addition, the shutter button 105a is turned on to generate a second shutter switch signal SW2 when the shutter button 105a is operated completely, that is, full-pressed (shooting instruction). Upon receiving the second shutter switch signal SW2, the control unit 101 starts a series of shooting operations from reading out a signal from the image capturing unit 102 to writing image data in the recording medium 110.

The display unit 106 displays a viewfinder image at the time of shooting, a captured image, and characters for a dialogical operation. The display unit 106 is, for example, a display device such as a liquid crystal display or organic EL display. The display unit 106 may be integrally formed with the digital camera 100 or an external apparatus connected to the digital camera 100.

The image capturing unit 102 records a coded image file in the recording medium 110. The control unit 101 reads out an already recorded image file from the recording medium 110. The recording medium 110 may be a memory card, hard disk drive, or the like mounted in the digital camera 100, or a flash memory or hard disk drive built in the digital camera 100.

The wireless communication unit 111 is an interface for connecting with an external apparatus such as a smart phone 200. The digital camera 100 of the present embodiment can give and receive data with an external apparatus via the wireless communication unit 111. For example, the image data generated by the image capturing unit 102 can be transmitted to an external apparatus via the wireless communication unit 111. In the present embodiment, the wireless communication unit 111 includes an interface for communicating with an external apparatus via a so-called wireless LAN according to the IEEE 802.11 standard. The control unit 101 implements wireless communication with an external apparatus by controlling the wireless communication unit 111. Note that the communication method is not limited to the wireless LAN, and includes, for example, an infrared communication method.

The short-range wireless communication unit 112 includes, for example, an antenna for wireless communication and a modulation/demodulation circuit and a communication controller for processing a wireless signal. The short-range wireless communication unit 112 includes an interface for performing a short-range wireless communication according to the IEEE802.15.1 standard (so-called Bluetooth®) with an external apparatus by outputting the modulated wireless signal from the antenna, and demodulating the wireless signal received by the antenna. In the present embodiment, the short-range wireless communication is in accordance with version 4.0 of Bluetooth® Low Energy (BLE) which is low power consumption, for example. This short-range wireless communication has a narrower communicable range than the wireless LAN communication (that is, the communicable distance is short). The communication speed or rate of the BLE is slower than wireless LAN communication. On the other hand, the BLE consumes less power than wireless LAN communication.

To wirelessly connect the digital camera 100 with the external apparatus, these apparatuses may be brought into a range in which short-range wireless communication is possible. The control unit 101 implements short-range wireless communication with the external apparatus by controlling the short-range wireless communication unit 112. The digital camera 100 is in communication with the external apparatus at all times via the short-range wireless communication unit 112 and is capable of automatically connecting with the wireless LAN by operating the digital camera 100 or the external apparatus to switch from the BLE to the wireless LAN.

Note that the short-range wireless communication unit 112 has either a peripheral mode or a central mode. The digital camera 100 according to the present embodiment can operate as a BLE peripheral device by causing the communication unit 112 to operate in the peripheral mode. If the digital camera 100) is to operate as the peripheral device, communication is possible by connecting the digital camera 100 to an external apparatus which is set to operate in the central mode. Note that for the authentication of a device serving as a connection partner, the unique information of the device serving as the connection partner is held in the nonvolatile memory 103 by performing pairing in advance. Also, if power is supplied to a BLE interface module even when the power supply switch 105e is off, the digital camera 100 can transmit an advertisement packet (to be referred to as an advertisement signal hereinafter).

<Configuration of Short-Range Wireless Communication Unit>

The configuration and functions of the short-range wireless communication unit of the digital camera according to the present embodiment will be described hereinafter with reference to FIGS. 2A and 2B.

Figure 2A:
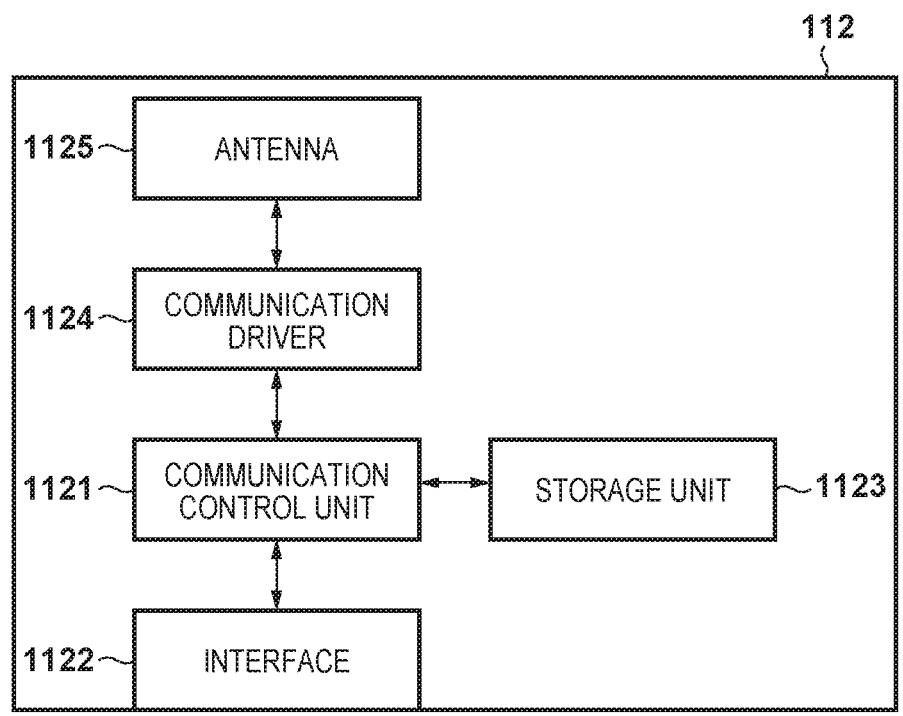
FIGS. 2A and 2B are functional block diagrams showing different configurations of the short-range wireless communication unit of the digital camera shown in FIG. 1A.
Figure 2B:
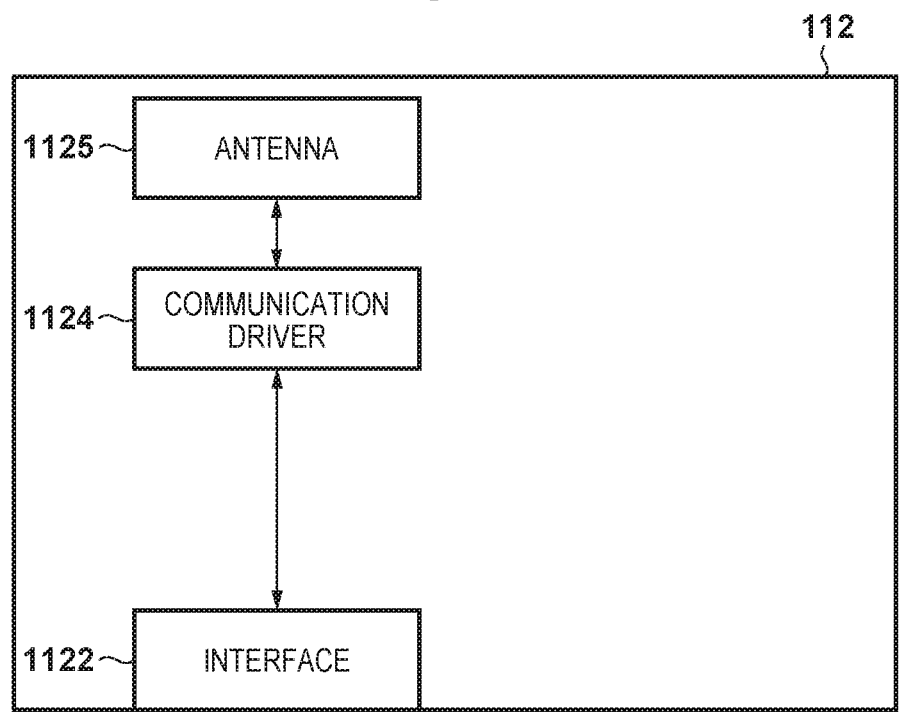

FIGS. 2A and 2B show different configurations of the short-range wireless communication unit 112 provided in the digital camera 100 of FIG. 1A. FIG. 2A illustrates a configuration that includes a communication control unit, whereas FIG. 2B illustrates a configuration that does not include a communication control unit. The digital camera 100 of the present embodiment has the configuration shown in FIG. 2B, which does not include a communication control unit. To facilitate the understanding of the present invention, the configurations in FIGS. 2A and 2B are described by contrasting each other.

Described first is the configuration in which the short-range wireless communication unit 112 includes a communication control unit 1121 as shown in FIG. 2A.

The communication control unit 1121 communicates with the control unit 101 via an interface 1122. When the control unit 101 is in a sleep state, a signal is generated to return the control unit 101 from the sleep state. Moreover, when the control unit 101 is not in a sleep state, the communication control unit 1121 performs data communication with the control unit 101 via UART (Universal Asynchronous Receiver/Transmit) or synchronous communication, such as SPI (Serial Peripheral Interface). A storage unit 1123 holds short-range wireless communication connection information (pairing information). A communication driver 1124 receives a connection request from the external device via an antenna 1125 and notifies the communication control unit 1121 of the received data. Moreover, the communication driver 1124 generates an advertisement signal in response to a transmission request from the communication control unit 1121 and transmits the advertisement signal to the external apparatus via the antenna 1125.

If receiving a connection request from the external apparatus when the control unit 101 is in a sleep state, the communication control unit 1121 can determine whether or not to return the control unit 101. For example, if the communication control unit 1121 receives a remote control instruction from the external apparatus when the digital camera 100 is in a sleep state, the communication control unit 1121 returns the control unit 101 from the sleep state. Furthermore, the communication control unit 1121 performs processing without returning the control unit 101 from a sleep state if short-range wireless communication with the external apparatus is reestablished or disconnected or if a connection request is received from an external apparatus with which pairing has not been performed. That is, when a connection request is received, the communication control unit 1121 can perform control over whether or not to return the control unit 101 from a sleep state.

Next, the configuration in which the short-range wireless communication unit 112 does not include a communication control unit 1121 will be described as shown in FIG. 2B.

As the short-range wireless communication unit 112 does not include a communication control unit 1121 and a storage unit 1123 unlike the short-range wireless communication unit 112 of FIG. 2A, the cost can be reduced compared with the short-range wireless communication unit 112 of FIG. 2A. In the configuration of FIG. 2B, the control unit 101 also serves as the communication control unit 1121. Therefore, when the communication driver 1124 receives a connection request from an external apparatus via the antenna 1125 with control unit 101 in a sleep state as in FIG. 2A, the communication driver 1124 returns the control unit 101 from the sleep state via the interface 1122. Furthermore, the communication driver 1124 also returns the control unit 101 from a sleep state when receiving a connection request from an external apparatus with which pairing has not been performed. That is, as the configuration in FIG. 2B lacks a component that corresponds to the communication control unit 1121, it is not possible to control whether or not to return the control unit 101 from a sleep state. Therefore, whenever a connection request is received, the control unit 101 is always returned from a sleep state.

Moreover, as the short-range wireless communication unit 112 does not include a storage unit 1123 unlike the short-range wireless communication unit 112 of FIG. 2A, when the control unit 101 transits to a sleep state, the communication driver 1124 notifies the control unit 101 of short-range wireless communication connection information via the interface 1122. Then, the control unit 101 stores the short-range wireless communication connection information in the nonvolatile memory 103.

The configurations of two types of short-range wireless communication units have been described above. As described above, in the configuration of the present embodiment, the short-range wireless communication unit 112 includes no communication control unit 1121 as shown in FIG. 2B.

Note that a sleep state refers to a state in which power consumption is reduced while a power ON condition is maintained to hold the memory data. As the power supply to the memory is maintained, the control unit 101 is capable of immediately returning from a sleep state to resume processing. Additionally, in the present embodiment, the short-range wireless communication unit 112 is capable of communication when the control unit 101 is in a sleep state.

<System Configuration>

Next, the operation of the system of the present embodiment will be described with reference to FIG. 3.

FIG. 3 is a system configuration diagram of the present embodiment that illustrates a configuration in which a digital camera 100 and a plurality of smart phones 200 and 300 perform short-range wireless communication via BLE.

Each of the smart phones 200 and 300 has, as means to perform wireless communication with the digital camera 100, a wireless communication unit, such as for a wireless LAN, and a short-range wireless communication unit, such as for BLE, in addition to a public switched network, such as telephone lines.

Moreover, an application that cooperates with the OS (Operating System), which is the basic software to implement applied functions, is installed in the smart phones 200 and 300. The communication processing of the smart phones of the present embodiment is implemented by reading the software provided by the application. Note that the application includes software to utilize the basic functions of the OS that is installed in the smart phones. Alternatively, the OS of the smart phones may have software to implement processes according to the present embodiment. The application of the present embodiment is assumed to be a camera control application (hereinafter referred to as a camera application) that controls the digital camera 100 via BLE and performs processing such as shooting of an image and browsing/saving of captured images.

The following describes pairing so as to allow the digital camera 100 and the smart phone 200 to perform BLE communication.

Once BLE pairing is started by user operation, the digital camera 100 transmits an advertisement signal to the surroundings.

The smart phone 200 searches for an advertisement signal transmitted by the short-range wireless communication unit 112 of the digital camera 100. In addition, upon receiving an advertisement signal, the smart phone 200 displays the name of the camera on the display unit based on the short-range wireless communication connection information contained in the advertisement signal to notify the user that the digital camera 100 has been detected. Once the user sees the notification on the display unit and instructs the smart phone 200 to be paired with the digital camera 100), the smart phone transmits a connection request to the digital camera 100.

The smart phone 200 transmits a pairing request to the digital camera 100 and exchanges encryption key information to encrypt transmission data, thus allowing the smart phone 200 and the digital camera 100 to perform encrypted communication with each other. Subsequently, the smart phone 200 transmits identification information about the camera application activated on the smart phone 200, and the digital camera 100 stores the identification information received from the smart phone 200 to complete the pairing. Once the pairing is completed, the control unit 101 stores in the nonvolatile memory 103 the short-range wireless communication connection information required for reconnection, such as the short-range wireless communication address and the key information of the smart phone 200.

The foregoing procedure completes the pairing between the digital camera 100 and the smart phone 200. Subsequently, if the smart phone 200 detects an already paired digital camera 100 that has been connected to the smart phone in the past, the smart phone 200 can determine that pairing has been performed by checking the detected camera against the information stored in the nonvolatile memory 103.

Note that while the digital camera 100 has been paired with the smart phone 200 in this embodiment, the smart phone 300 has not been paired with the digital camera 100.

<Returning Processing from Sleep State>

Next, the processing to return the digital camera 100 of the system according to the present embodiment will be described with reference to FIGS. 4A to 6.

Figure 4A:
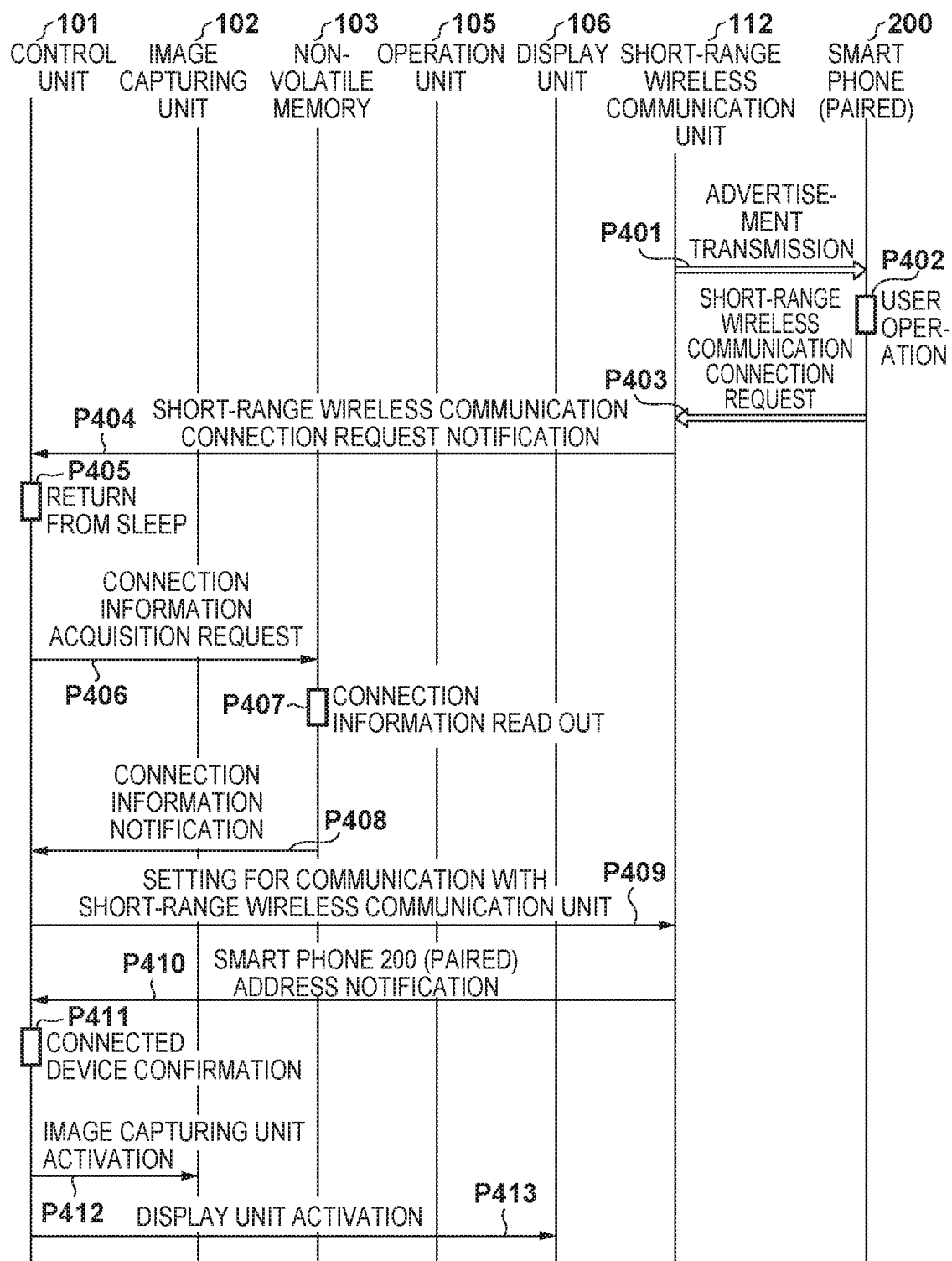
FIGS. 4A and 4B are sequence diagrams showing how the digital camera of the first embodiment communicates with a paired smart phone.
Figure 4B:
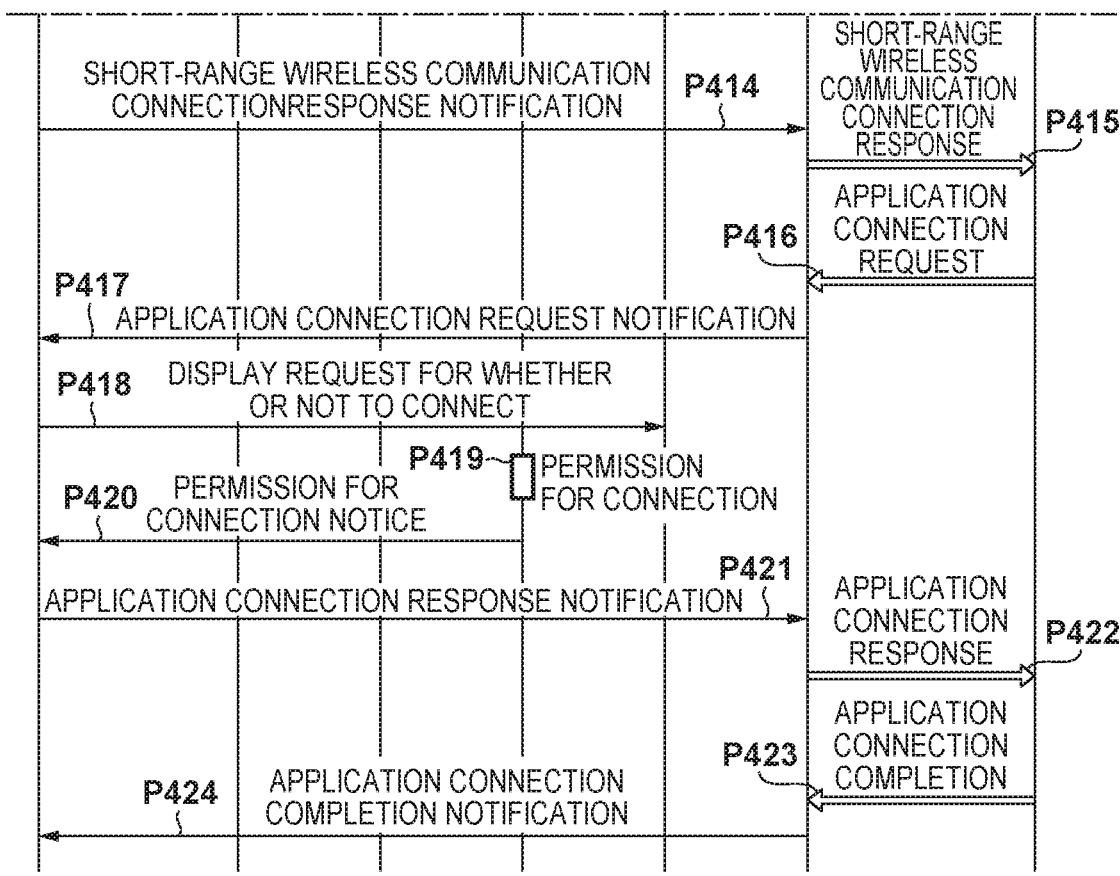

FIGS. 4A and 4B illustrate the sequence in which the digital camera 100 returns from a sleep state upon receiving a short-range wireless communication connection request from the paired smart phone 200 according to the present embodiment.

Note that, in this case, the digital camera 100 and the smart phone 200 have been already paired via Bluetooth®, so that the short-range wireless communication unit 112 of the digital camera 100 is capable of communication while the control unit 101 is still in a sleep state.

In P401, the short-range wireless communication unit 112 transmits an advertisement signal to notify the apparatuses in the surroundings of the presence of the digital camera 100. In P402, after the smart phone 200 receives the advertisement signal transmitted from the short-range wireless communication unit 112, user operation is performed to connect with the digital camera 100 via short-range wireless communication. For example, the smart phone 200 displays a guidance message, such as "A digital camera has been detected. Do you want to connect?" and the sequence proceeds to P403 by the user's operation to make a connection.

In P403, the smart phone 200 transmits a short-range wireless communication connection request to the short-range wireless communication unit 112. In P404, upon receiving the short-range wireless communication connection request from the smart phone 200, the short-range wireless communication unit 112 notifies the control unit 101 of the short-range wireless communication connection request. As described above, the short-range wireless communication unit 112 used in the present embodiment notifies the control unit 101 of the short-range wireless communication connection request without specifically determining whether or not the smart phone 200, which has transmitted a connection request, has been already paired.

In P405, the control unit 101 returns from a sleep state upon receiving the notification of the short-range wireless communication connection request from the short-range wireless communication unit 112. In this step, however, the components of the digital camera 100 that are activated are limited unlike when the entire digital camera 100 is activated upon pressing the button on the main body of the digital camera 100. In particular, it is preferable if the components whose activation can be detected by the user are not activated. In particular, the digital camera 100 is activated in such a manner as to appear to the user as if the digital camera remains in a sleep state by preventing the operation of the display unit 106 and the extension of the lens tube of the image capturing unit 102.

In P406, after returning from sleep, the control unit 101 requests to acquire short-range wireless communication connection information from the nonvolatile memory 103, and in P407, the nonvolatile memory 103 reads out the short-range wireless communication connection information and, in P408, notifies the control unit 101 of the short-range wireless communication connection information. In P409, upon acquiring the short-range wireless communication connection information, the control unit 101 performs communication settings to communicate with the short-range wireless communication unit 112. In P410, once the control unit 101 performs the communication settings, the short-range wireless communication unit 112 notifies the control unit 101 of the short-range wireless communication address of the smart phone 200.

In P411, upon receiving the short-range wireless communication address from the short-range wireless communication unit 112, the control unit 101 confirms whether or not the received address matches the short-range wireless communication address of the smart phone 200 stored as part of the short-range wireless communication connection information acquired in P407. In other words, at this timing, the control unit 101 determines whether or not the smart phone 200, which has transmitted the connection request, has been already paired. As this sequence is about communication with the already paired smart phone 200, these short-range wireless communication addresses match so that the control unit 101 determines that the digital camera has returned from a sleep state due to a short-range wireless communication connection request from the already paired smart phone 200. As the image capturing unit 102 is activated (P412) and the display unit 106 is also activated (P413). The digital camera 100 becomes capable of shooting in P412, and the display unit 106 is lit in P413. This lets the user know that the digital camera 100 has returned from a sleep state.

In P414, the control unit 101 transmits a short-range wireless communication connection response notification to the short-range wireless communication unit 112. In P415, the short-range wireless communication unit 112 transmits a short-range wireless communication connection response to the smart phone 200. In P416, upon receiving the short-range wireless communication connection response from the short-range wireless communication unit 112, the smart phone 200 transmits a request for connection of the camera application with the digital camera 100 to the short-range wireless communication unit 112. In P417, the short-range wireless communication unit 112 transmits an application connection request notification to the control unit 101. In P418, the control unit 101 requests the display unit 106 to display whether or not to connect with the smart phone 200, causing the display unit 106 to display an application screen for selecting whether or not to connect with the smart phone 200. Subsequently, as the operation unit 105 is operated to grant permission for connection (P419), a notification of permission for connection is transmitted from the operation unit 105 to the control unit 101 (P420). In P421, upon receiving permission for connection from the operation unit 105, the control unit 101 transmits an application connection response notification to the short-range wireless communication unit 112. In P422, the short-range wireless communication unit 112 transmits an application connection response to the smart phone 200. The application connection response may include wireless communication connection information about the wireless communication unit 111, such as an SSID (Service Set Identifier) and a password. In that case, in P421, the control unit 101 notifies the short-range wireless communication unit 112 of the wireless communication connection information. In P423, upon receiving the application connection response, the smart phone 200 notifies the short-range wireless communication unit 112 that the connection with the camera application is completed. In P424, the short-range wireless communication unit 112 notifies the control unit 101 that the connection with the camera application is completed. After P424, in P402, the digital camera 100 is remotely controlled in response to the user operation performed in P402.

Next, the sequence of the present embodiment in which the digital camera 100 returns from a sleep state upon receiving a short-range wireless communication connection request from an unpaired smart phone 300 will be described with reference to FIG. 5.

Note that, here, the digital camera 100 and the smart phone 200 have been already paired, so that the short-range wireless communication unit 112 of the digital camera 100 is capable of communication while the control unit 101 is still in a sleep state.

In P501, the short-range wireless communication unit 112 transmits an advertisement signal to notify the apparatuses in the surroundings of the presence of the digital camera 100. In P502, after the smart phone 300 receives the advertisement signal transmitted from the short-range wireless communication unit 112, user operation is performed to connect with the digital camera 100 via short-range wireless communication.

In P503, the smart phone 300 transmits a short-range wireless communication connection request to the short-range wireless communication unit 112. In P504, upon receiving the short-range wireless communication connection request from the smart phone 300, the short-range wireless communication unit 112 notifies the control unit 101 of the short-range wireless communication connection request. In P505, the control unit 101 returns from a sleep state upon receiving the notification of the short-range wireless communication connection request from the short-range wireless communication unit 112. In P506, after returning from a sleep state, the control unit 101 requests short-range wireless communication connection information from the nonvolatile memory 103. In P507, the nonvolatile memory 103 reads out the short-range wireless communication connection information and, in P508, notifies the control unit 101 of the short-range wireless communication connection information.

In P509, upon acquiring the short-range wireless communication connection information, the control unit 101 performs communication settings to communicate with the short-range wireless communication unit 112. In P510, once the control unit 101 performs the settings for communicating with the short-range wireless communication unit, the short-range wireless communication unit 112 notifies the control unit 101 of the short-range wireless communication address of the smart phone 300.

In P511, upon receiving the short-range wireless communication address from the short-range wireless communication unit 112, the control unit 101 confirms whether or not the received address matches the short-range wireless communication address of the smart phone 200 stored as part of the short-range wireless communication connection information acquired in P507. As the short-range wireless communication addresses do not match in this sequence, the control unit 101 determines that the digital camera has returned from a sleep state due to a short-range wireless communication connection request from the unpaired smart phone 300. Subsequently, the control unit 101 transmits a short-range wireless communication disconnection request to the short-range wireless communication unit 112 (P512), which in turn disconnects the short-range wireless communication with the smart phone 300) (P513). Then, the control unit 101 requests the short-range wireless communication unit 112 to transmits an advertisement signal (P514), causing the short-range wireless communication unit 112 to start transmitting advertisement signal (P515). In P516, the control unit 101 transits to a sleep state.

As described above, if the digital camera 100 returns from a sleep state due to a connection request from the unpaired smart phone 300, the digital camera 100 transits to a sleep state without activating the image capturing unit 102 or the display unit 106, unlike in P412 and P413, respectively. In this way, if activated due to communication from an unpaired smart phone, i.e., a smart phone not intended by the user, the digital camera 100 can transit back to a sleep state without letting the user know that the digital camera has been activated.

Figure 6:
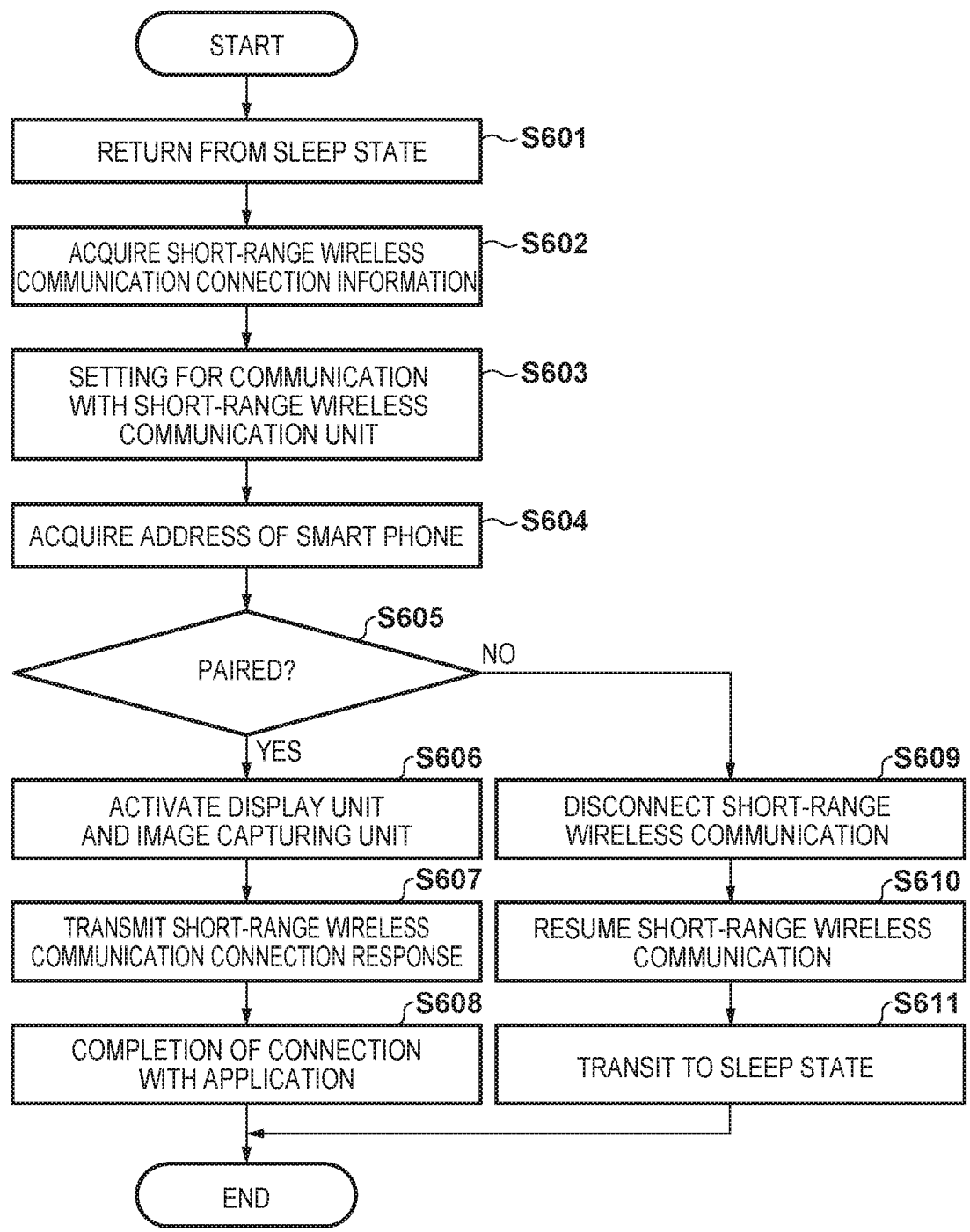
FIG. 6 is a flowchart showing the process in which the digital camera of the first embodiment communicates with a paired or unpaired smart phone.

FIG. 6 shows the processing in which the digital camera 100 returns from a sleep state upon receiving a short-range wireless communication connection request from the smart phone 200 or the smart phone 300 according to the present embodiment.

Note that the following description starts with the point in the processing at which the control unit 101 of the digital camera 100 is in a sleep state and has received a short-range wireless communication connection request notification from the short-range wireless communication unit 112 in P404 or P504.

In S601, the control unit 101 returns from a sleep state upon receiving the notification of the short-range wireless communication connection request from the short-range wireless communication unit 112. In S602, after returning from a sleep state, the control unit 101 acquires short-range wireless communication connection information from the nonvolatile memory 103. In S603, after acquiring the short-range wireless communication connection information in S602, the control unit 101 performs communication settings with the short-range wireless communication unit 112. After performing communication settings in S603, the control unit 101 acquires the short-range wireless communication address of the smart phone 300 from the short-range wireless communication unit 112 in S604. In S605, once acquiring the short-range wireless communication address in S604, the control unit 101 compares it with the short-range wireless communication address included in the short-range wireless communication connection information acquired in S602. If the short-range wireless communication addresses match in S605, the control unit 101 determines that this is the paired smart phone 200 and, in S606, activates the image capturing unit 102 and the display unit 106. Then, in S607, the control unit 101 transmits a short-range wireless communication connection response to the short-range wireless communication unit 112. This causes the short-range wireless communication unit 112 to transmit a short-range wireless communication connection response to the smart phone 200 and receives an application connection request from the smart phone 200. Then, the short-range wireless communication unit 112 transmits an application connection response to the smart phone 200 and receives an application connection completion notification from the smart phone 200. Subsequently, in S608, the control unit 101 receives a short-range wireless communication connection completion notification from the short-range wireless communication unit 112.

Meanwhile, if the short-range wireless communication addresses do not match in S605, the control unit 101 determines that this is the unpaired smart phone 300 and, in S609, requests the short-range wireless communication unit 112 to disconnect the short-range wireless communication. Then, in S610, the control unit 101 requests the short-range wireless communication unit 112 to resume short-range wireless communication and, in S611, the short-range wireless communication unit 112 starts to transmit an advertisement signal. In S611, after requesting resumption of short-range wireless communication, the control unit 101 transits back to a sleep state.

According to the above-described embodiment, if the digital camera 100 returns from a sleep state due to a short-range wireless communication connection request from the unpaired smart phone 300, the digital camera 100 can transit back to a sleep state without letting the user know that the digital camera has been activated. To implement this processing, the present embodiment determines whether or not the short-range wireless communication address stored in advance in the nonvolatile memory 103 matches the short-range wireless communication address of the smart phone 300 communicated by the short-range wireless communication unit 112. Meanwhile, if these addresses do not match, the control unit 101 does not activate the image capturing unit 102 or the display unit 106, requests the short-range wireless communication unit 112 to disconnect the communication with the smart phone 300, and then transits back to a sleep state after an advertisement signal is transmitted again.

In the present embodiment, neither the image capturing unit 102 nor the display unit 106 is activated so as not to let the user know that the digital camera 100 has been activated. However, part of the display unit 106, such as a lamp, may be activated as minimally required operation so that the user can tell that the digital camera is turned on. In this case, it is also preferable to keep the power consumption lower than during the normal activation.

Second Embodiment

The following describes a second embodiment.

Figure 7:
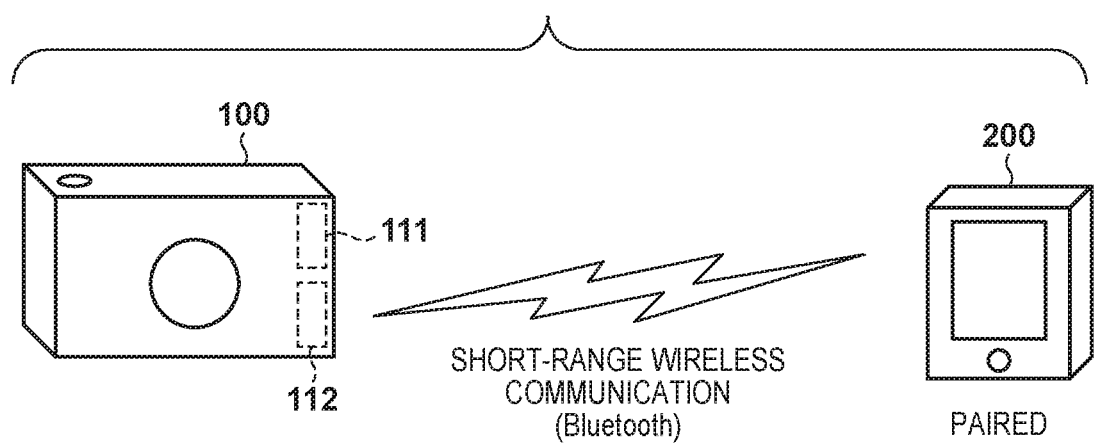
FIG. 7 is a view showing the system configuration of the second embodiment.

FIG. 7 is a system configuration diagram of the present embodiment that illustrates a configuration in which a digital camera 100 and a smart phone 200 perform short-range wireless communication.

Figure 1B:
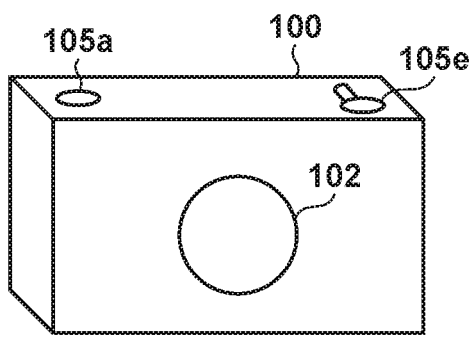
FIGS. 1B and 1C are a front view and a back view of the digital camera of the first and second embodiments.
Figure 1C:
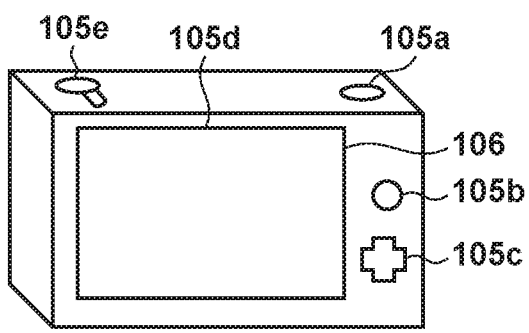

The configuration of the digital camera 100 is the same as that of the first embodiment shown in FIG. 1A to 1C. The configuration of the smart phone 200 is also the same as that of the first embodiment.

<Returning Processing from Sleep State>

Next, the processing to return the digital camera 100 of the system according to the present embodiment will be described with reference to FIG. 8.

Figure 8:
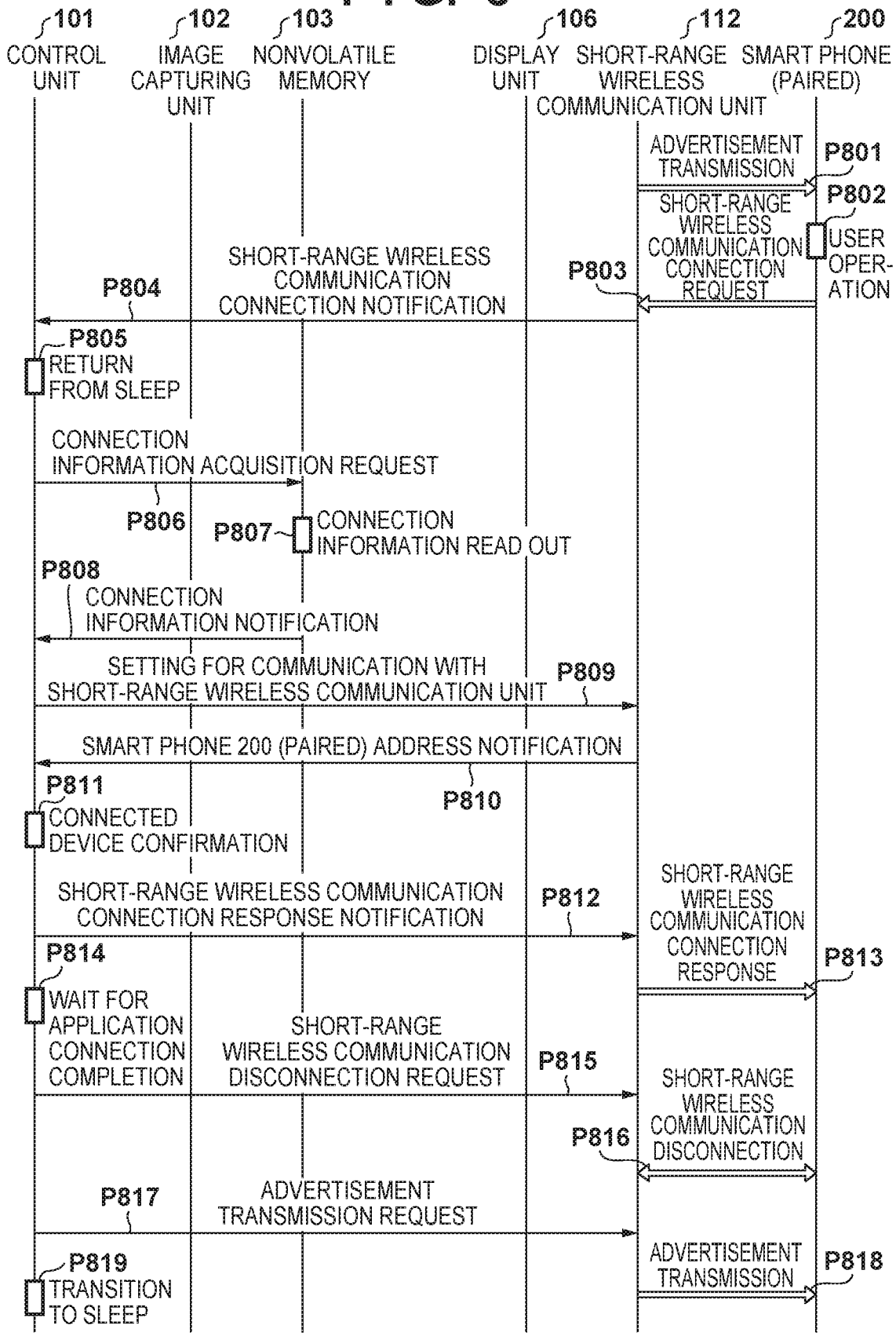
FIG. 8 is a sequence diagram showing how the digital camera of the second embodiment communicates with a paired smart phone.

FIG. 8 illustrates the sequence according to the present embodiment in which the digital camera 100 returns from a sleep state upon receiving a short-range wireless communication connection request in response to operation other than operation of the camera application on the paired smart phone 200.

Note that, here, the digital camera 100 and the smart phone 200 have been already paired, so that the short-range wireless communication unit 112 of the digital camera 100 is capable of communication while the control unit 101 is still in a sleep state.

In P801, the short-range wireless communication unit 112 transmits an advertisement signal to notify the apparatuses in the surroundings of the presence of the digital camera 100. In P802, after the smart phone 200 receives the advertisement signal transmitted from the short-range wireless communication unit 112, user operation is performed to connect with the digital camera 100 via short-range wireless communication. The user operation in P802 is, for example, operation of the digital camera 100 via an application other than the camera application.

In P803, the smart phone 200 transmits a short-range wireless communication connection request to the short-range wireless communication unit 112. In P804, upon receiving the short-range wireless communication connection request from the smart phone 200, the short-range wireless communication unit 112 notifies the control unit 101 of the short-range wireless communication connection request. In P805, the control unit 101 returns from a sleep state upon receiving the notification of the short-range wireless communication connection request from the short-range wireless communication unit 112. In P806, after returning from a sleep state, the control unit 101 requests short-range wireless communication connection information from the nonvolatile memory 103. In P807, the nonvolatile memory 103 reads out the short-range wireless communication connection information and, in P808, notifies the control unit 101 of the short-range wireless communication connection information.

In P809, upon acquiring the short-range wireless communication connection information, the control unit 101 performs communication settings to communicate with the short-range wireless communication unit 112. In P810, once the control unit 101 performs the communication settings with the short-range wireless communication unit, the short-range wireless communication unit 112 notifies the control unit 101 of the short-range wireless communication address of the smart phone 200. In P811, upon receiving the short-range wireless communication address from the short-range wireless communication unit 112, the control unit 101 confirms whether or not the received address matches the short-range wireless communication address of the smart phone 200 stored as part of the short-range wireless communication connection information acquired in P807. As the short-range wireless communication addresses match in case, the control unit 101 determines that the digital camera has returned from a sleep state due to a short-range wireless communication connection request from the paired smart phone 200 and transmits a short-range wireless communication connection response notification to the short-range wireless communication unit 112 (P812).

In P813, the short-range wireless communication unit 112 transmits a short-range wireless communication connection response to the smart phone 200. Then, in P814, the control unit 101 waits for a predetermined period of time for a notification of completion of connection with the camera application from the short-range wireless communication unit 112. In this sequence, the smart phone 200 does not transmit a camera application connection request to the short-range wireless communication unit 112, for example, because operation of the digital camera 100 is being performed via an application other than the camera application in P802. As a result, the control unit 101 does not receive a notification of completion of connection with the camera application from the short-range wireless communication unit 112 within the predetermined period of time. In this case, the control unit 101 transmits a short-range wireless communication disconnection request to the short-range wireless communication unit 112 in P815. In P816, the short-range wireless communication unit 112 disconnects the short-range wireless communication with the smart phone 200 and, in P817, requests the short-range wireless communication unit 112 to transmit an advertisement signal. In P818, the short-range wireless communication unit 112 starts transmitting an advertisement signal. In P819, after requesting transmission of an advertisement signal, the control unit 101 transits back to a sleep state.

The foregoing example describes a case in which, in P814, a notification of completion of connection with the camera application is not received within a predetermined period. Conversely, if a notification of completion of connection with the application from the short-range wireless communication unit 112 is received within a predetermined period of time in P814, the control unit 101 activates the image capturing unit 102 and the display unit 106. Then, the digital camera 100 is remotely controlled in response to user operation. In this way, even if the connection partner has been paired, unless that connection partner cannot be actually remotely controlled, the digital camera 100 can be brought back into a sleep state without letting the user know of the activation.

Figure 9:
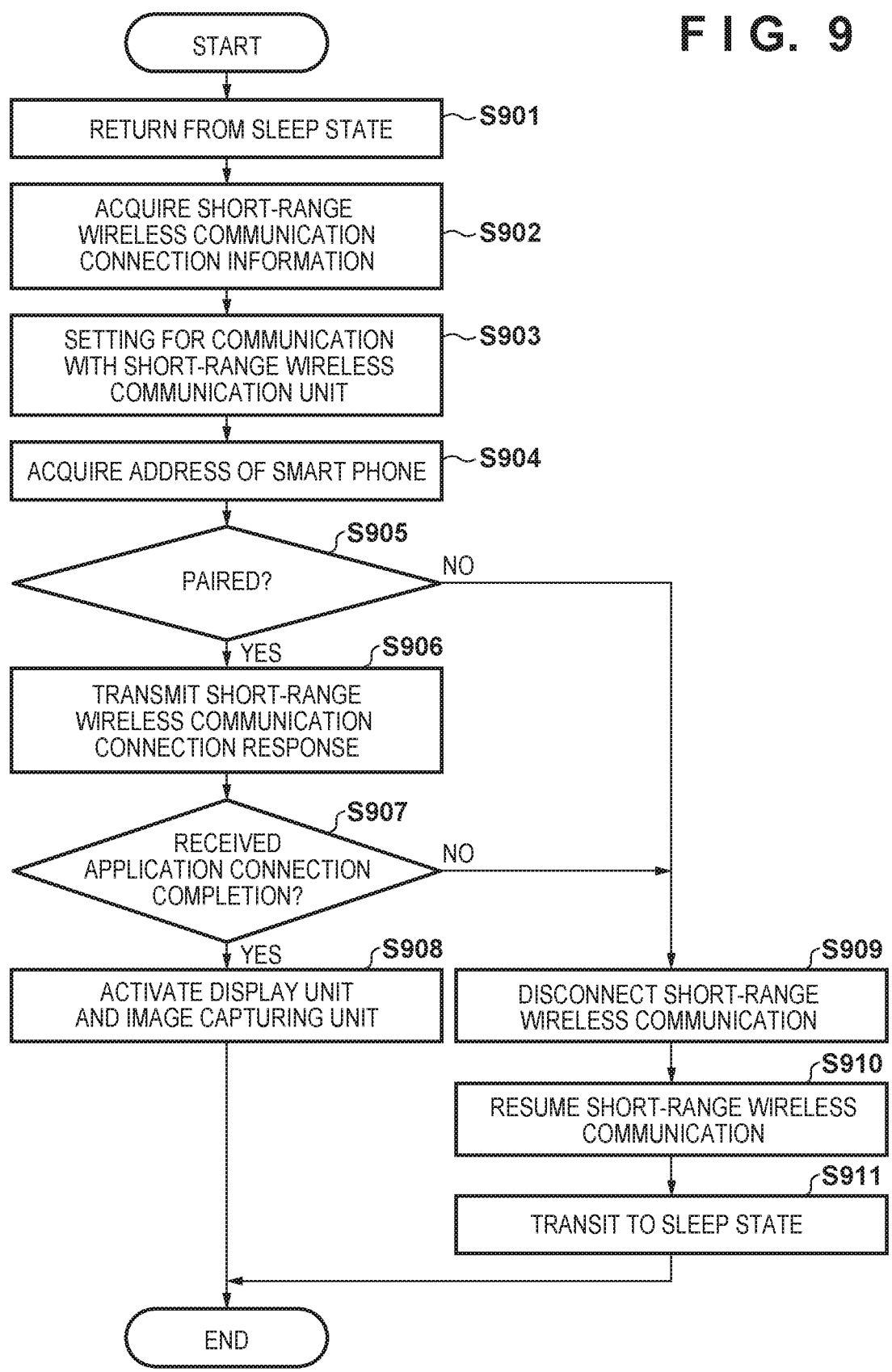
FIG. 9 is a flowchart showing the process in which the digital camera of the second embodiment communicates with a paired or unpaired smart phone.

FIG. 9 illustrates the processing according to the present embodiment in which the digital camera 100 returns from a sleep state upon receiving a short-range wireless communication connection request in response to operation other than operation of the camera application on the smart phone 200.

Note that the following description starts with the point in the processing at which the control unit 101 of the digital camera 100 is in a sleep state and has received a short-range wireless communication connection request notification from the short-range wireless communication unit 112 in P804.

Note that as the processing from S901-S905 and S909-S911 of FIG. 9 is identical with that from S601-S605 and S609-S611 of FIG. 6, description thereof is omitted.

If the short-range wireless communication addresses match in S905 and the control unit 101 determines that this is the paired smart phone 200, the control unit 101 transmits a short-range wireless communication connection response to the short-range wireless communication unit 112 in S906. In S907, the short-range wireless communication unit 112 transmits a short-range wireless communication connection response to the smart phone 200, and the control unit 101 waits for a notification of completion of connection with the camera application from the short-range wireless communication unit 112 for a predetermined period of time.

If a notification of completion of connection with the application from the short-range wireless communication unit 112 is received within a predetermined period of time in S907, the control unit 101 activates the image capturing unit 102 and the display unit 106 in S908.

On the other hand, if the short-range wireless communication addresses do not match in S905 or if a notification of completion of connection with the application from the short-range wireless communication unit 112 is not received within the predetermined period of time in S907, the control unit 101 determines that the smart phone is an unpaired smart phone or that the smart phone is a paired smart phone but the operation is not via the camera application, thus performing the same processing in S909-S911 as that in S609-S611 of FIG. 6.

According to the above-described embodiment, if the digital camera 100 returns from a sleep state due to a short-range wireless communication connection request from the paired smart phone 200 in response to operation other than operation of the camera application, the digital camera 100 can transit back to a sleep state without letting the user know that the digital camera has been activated. To implement this processing, the present embodiment determines whether or not the short-range wireless communication address stored in advance in the nonvolatile memory 103 matches the short-range wireless communication address of the smart phone 200 communicated by the short-range wireless communication unit 112. Even if the addressees match, unless the control unit 101 receives a notification of completion of connection with the application from the short-range wireless communication unit 112 within a predetermined period of time, the short-range wireless communication unit 112 is requested to disconnect the communication with the smart phone 200 and transmit an advertisement signal again without activating the image capturing unit 102 or the display unit 106. Subsequently, the control unit 101 transits to a sleep state again.

Other Embodiments

The digital camera of the above-described embodiments performs control to determine whether to continue communication or return to a sleep state depending on whether or not the smart phone has been paired. It should be noted, however, that the criteria for performing this control are not limited to whether or not pairing has been performed as in the above-described embodiments. For example, whether or not a given smart phone has connected to a digital camera in the past may be determined by storing as history data the IDs or the like of the smart phones with which the digital camera has connected. Alternatively, for example, the user may register the ID of the user's smart phone with the digital camera so that the camera can return from sleep and remotely controlled only when the camera receives a connection request from the user's smart phone.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-237853, filed Dec. 12, 2017 which is hereby incorporated by reference herein in its entirety.

What is claimed is:

1. An electronic apparatus comprising:
a communication unit configured to wirelessly communicate with an external apparatus present within a predetermined range; and
a control unit configured to control the electronic apparatus;
wherein, upon receiving a connection request from the external apparatus in response to an advertisement signal transmitted via the communication unit when the control unit is in a sleep state in which its power consumption is reduced, the control unit returns from the sleep state and determines whether or not the external apparatus, which has transmitted the connection request, has been connected to the electronic apparatus in the past, and if determining that the external apparatus, which has transmitted the connection request, has not been connected to the electronic apparatus in the past, the control unit transits to the sleep state.

2. The apparatus according to claim 1, wherein if determining that the external apparatus, which has transmitted the connection request, has been connected to the electronic apparatus in the past, the control unit connects with the external apparatus via the communication unit.

3. The apparatus according to claim 1, wherein if receiving a connection request from the external apparatus, the communication unit notifies the control unit of the reception of the connection request, and upon receiving the notification, the control unit returns from the sleep state.

4. The apparatus according to claim 1, wherein the electronic apparatus further comprises a storage unit configured to store information about external apparatuses to which the electronic apparatus has connected in the past, and
wherein the control unit makes the determination by comparing information acquired from the external apparatus via the communication unit with the information stored by the storage unit about external apparatuses to which the electronic apparatus has connected in the past.

5. The apparatus according to claim 1, wherein, if determining that the external apparatus has not been connected to the electronic apparatus in the past, the control unit performs disconnects wireless communication via the communication unit and transits to the sleep state after resuming wireless communication via the communication unit.

6. The apparatus according to claim 1, wherein, if determining that the external apparatus has not been connected to the electronic apparatus in the past, the control unit returns from the sleep state without activating part of the electronic apparatus.

7. The apparatus according to claim 1, wherein, if determining that the external apparatus has not been connected to the electronic apparatus in the past, the control unit transits to the sleep state without activating an image capturing unit or a display unit provided in the electronic apparatus.

8. The apparatus according to claim 2, wherein, if determining that the external apparatus has been connected to the electronic apparatus in the past, the control unit connects with an application installed in the external apparatus to remotely control the electronic apparatus.

9. The apparatus according to claim 8, wherein, if determining that the external apparatus has been connected to the electronic apparatus in the past, the control unit determines whether or not the control unit has returned from the sleep state in response to predetermined operation on the external apparatus, and if determining that the control unit has returned from the sleep state due to operation other than the predetermined operation via the application, the control unit transits to the sleep state.

10. The apparatus according to claim 1, wherein the wireless communication is short-range wireless communication.

11. The apparatus according to claim 1, wherein the communication unit is capable of communication when the electronic apparatus in the sleep state.

12. A method of controlling an electronic apparatus having a communication unit configured to wirelessly communicate with an external apparatus present within a predetermined range, and a control unit configured to control the electronic apparatus, the method comprising causing the control unit to:
upon receiving a connection request from the external apparatus in response to an advertisement signal transmitted via the communication unit when the control unit is in a sleep state in which its power consumption is reduced,
return from the sleep state and determine whether or not the external apparatus, which has transmitted the connection request, has been connected to the electronic apparatus in the past, and
transit to the sleep state if it is determined that the external apparatus, which has transmitted the connection request, has not been connected to the electronic apparatus in the past.

13. A non-transitory computer-readable storage medium storing a program for causing a computer to function as an electronic apparatus comprising:
a communication unit configured to wirelessly communicate with an external apparatus present within a predetermined range; and
a control unit configured to control the electronic apparatus;
wherein, upon receiving a connection request from the external apparatus in response to an advertisement signal transmitted via the communication unit when the control unit is in a sleep state in which its power consumption is reduced, the control unit returns from the sleep state and determines whether or not the external apparatus, which has transmitted the connection request, has been connected to the electronic apparatus in the past, and if determining that the external apparatus, which has transmitted the connection request, has not been connected to the electronic apparatus in the past, the control unit transits to the sleep state.

* * * * *